United States Patent
Kurosawa et al.

[19]

[11] Patent Number: 6,155,721
[45] Date of Patent: Dec. 5, 2000

[54] DYNAMIC-PRESSURE FLUID BEARING

[75] Inventors: Hironori Kurosawa; Tokuhisa Tsutsui; Yasushi Mizusaki; Hiromasa Marumo; Masamichi Hayakawa, all of Shimosuwa-machi, Japan

[73] Assignee: Sankyo Seiki Mfg. Co., Ltd., Nagano-ken, Japan

[21] Appl. No.: 09/093,106

[22] Filed: Jun. 8, 1998

Related U.S. Application Data

[63] Continuation-in-part of application No. 08/714,272, Sep. 17, 1996, Pat. No. 5,763,967, which is a continuation-in-part of application No. 08/412,250, Mar. 28, 1995, abandoned.

[30]     Foreign Application Priority Data

Apr. 1, 1994  [JP]  Japan ...................................... 6-64989
Dec. 20, 1994  [JP]  Japan ................................... 6-334606

[51] Int. Cl.⁷ .................................................. F16C 32/06
[52] U.S. Cl. ........................................... 384/100; 384/908
[58] Field of Search ..................................... 384/100, 107, 384/114, 908, 909

[56]            References Cited

U.S. PATENT DOCUMENTS

| | | | |
|---|---|---|---|
| 4,652,149 | 3/1987 | Nakaoka et al. ......................... | 384/100 |
| 4,681,928 | 7/1987 | Berger et al. ............................. | 528/353 |
| 5,066,884 | 11/1991 | Takagi et al. ............................. | 310/323 |
| 5,194,336 | 3/1993 | Yamada .................................... | 428/421 |
| 5,325,732 | 7/1994 | Vogel ................................... | 384/909 X |
| 5,434,695 | 7/1995 | Saito et al. ............................... | 359/200 |

FOREIGN PATENT DOCUMENTS 63-235719  9/1988  Japan .

*Primary Examiner*—Thomas R. Hannon
*Attorney, Agent, or Firm*—McAulay Nissen Goldberg Kiel & Hand, LLP

[57]            ABSTRACT

A dynamic-pressure fluid bearing comprises bearing parts formed by a pair of dynamic-pressure surfaces. One of the dynamic-pressure surfaces of the bearing parts is a polyamideimide coating thicker than 3 $\mu$m and the other surface is metal. The bearing is particularly applicable to driving motors for polygon mirrors. In addition, a so-called particle removing function is added to one or more of the surfaces of the bearing parts or a position nearby that causes easier removal of dust and other particles accumulated on the parts.

6 Claims, 6 Drawing Sheets

DYNAMIC-PRESSURE FLUID BEARING

RELATED APPLICATION

This is a continuation-in-part of U.S. patent application Ser. No. 08/714,272, filed Sep. 17, 1996, now U.S. Pat. No. 5,763,967 which is a continuation-in-part of U.S. patent application Ser. No. 08/412,250, filed Mar. 28, 1995, abandoned.

BACKGROUND OF THE INVENTION a) Field of the Invention

The present invention relates to a dynamic-pressure fluid bearing, such as a pneumatic bearing and liquid bearing, to be installed in a motor to drive a polygon mirror or hard disk.

b) Description of the Related Art

There are special motors, such as those for driving a polygon mirror or hard disk, which need high precision for high speed rotation. This requirement is met by the use of a dynamic-pressure fluid bearing which is lubricated with air or oil. An example of the motor driving a polygon mirror is shown in FIG. 2. A polygon mirror scans the laser beam in a digital copying machine or laser printer. The motor runs at 10000–30000 rpm.

To realize such a high rotary speed, the motor is provided with a dynamic-pressure fluid bearing which supports the rotor without contact. In FIG. 2, there is shown a polygon mirror 1 which is fitted on a projection 13 at the end of a rotor 2. The polygon mirror 1 is pressed against (and hence fixed to) the rotor 2 by a corrugated spring 17 held between it and a balancing plate 16. The rotor 2 is rotatably fitted in the bearing 5. The rotor 2 has spiral grooves 15 formed in its outer surface 14. Between the outer surface 14 of the rotor 2 and the inner surface of the bearing 5 is formed a dynamic-pressure pneumatic bearing which supports the rotor 2 rotating at a high speed. Both the rotor 2 and polygon mirror 1 are made of aluminum alloy, which is easy to machine.

For improvement on wear resistance, the outer surface of the rotor 2 is coated with electroless composite plating of SiC and nickel and the inner surface of the bearing 5 is coated with lubricating anodized film 26. (See Japanese Patent Laid-Open No. 235719/1988 filed by the present applicant.)

In the rotor 2 are an annular magnet 10 (forming the driving magnetic circuit) and an iron yoke 19. The iron yoke 19 is a bottomed cylindrical body which is fixed to the rotor 2 together with the balancing plate 16 by a screw 18 (with its head recessed) driven into a screw hole 20 in the bottom. Fixing by screws may be replaced by bonding with adhesive. The rotor 2 has a flank 21 at the upper part of its inner surface which is formed to prevent its contact with the yoke 19.

As shown in the partly enlarged sectional view in FIG. 2, the rotor 2, to which is fixed the polygon mirror 1, is inserted into the bearing 5. There is a clearance 27 between them which is of the order of several to ten-odd micrometers. It is in this clearance that the dynamic pressure occurs. The bearing 5 has a base 8 fixed thereto. The center column of the base 8 has a rotor driving coil 9 fitted thereto. This coil 9 and the annular magnet 10 constitute the motor drive. The center column of the base 8 has an annular magnet 11 attached to its outer surface at its upper part. The balancing plate 16 also has an annular magnet 12 attached to its inner surface. These two annular magnets 11 and 12 face each other, with their polarity opposite in the axial direction, so that they constitute a magnetic thrust bearing.

Certain problems exist with the above constructions. Since the rotor 2 is inserted into the bearing 5, with a clearance for dynamic pressure between, as mentioned above, the rotor 2 slides on the bearing 5 when the rotor starts before dynamic pressure occurs or when the rotor stops after dynamic pressure has disappeared. Sliding causes wear to the rotor and bearing. In addition, there is a possibility of the rotor 2 coming into contact with the bearing 5 during operation due to external turbulence. This would damage the dynamic-pressure surface.

In the conventional case where the dynamic-pressure pneumatic bearing is made of aluminum alloy, the problem associated with sliding (which causes wear and seizure) is approached by surface treatment such as electroless composite plating of SiC and nickel and lubricating anodized film. Such surface treatment provides good wear resistance but does not protect the dynamic-pressure surface from damage when the rotor comes into contact with the bearing during operation. Damage to the dynamic-pressure surface leads to seizure, which stops rotation, in the worst case. This is probable when the motor is mounted on a movable part.

One way of protecting the dynamic-pressure surface from damage is to make the bearing from quenched stainless steel or ceramics; however, such a material differs in thermal expansibility from aluminum alloy from which the polygon mirror is made. This creates an imbalance as the temperature changes.

Moreover, in the conventional case, the dynamic pressure pneumatic (fluid) bearing has poor jitter characteristic, and in the worst case, seizure results from jitter.

The volume resistivity of a coating layer in the dynamic pressure surfaces of bearing parts is high resulting in dust or powder to stick to the dynamic-pressure surfaces due to, for example, static electricity. While the motor rotates, the dust or powder makes contacts with the dynamic pressure surfaces and wears those surfaces. A conventional layer includes graphite, carbon black, which are a kind of conductive inorganic filler, but such conventional layer has $3 \times 10^{12}$ Ω cm (volume resitivity).

The volume resistivity of the conventional layer is high and an electrification makes it easy. As a result, there is adhesion of dust, etc., due to static electricity. During assembly, the dust remains on the dynamic pressure surfaces of the bearing parts (e.g., the space between a shaft and a bearing) resulting in a deteriorated jitter characteristic of the motor. Although the parts are cleaned during assembly, e.g., by use of an air gun, such cleaning is insufficient to completely remove the dust.

When the motor rotates, the remaining dust remains on the parts due to high static electricity. If the dust includes a hard foreign matter, then that foreign matter wears the layer that formed the shaft or the bearing. In the worst case, the motor seizures.

The resin powder wears the parts when the dynamic pressure surfaces slide on one another. Spaces form from the wear and the the dust and foreign matter move into the spaces making it even more difficult to remove the dust and foreign matter.

OBJECT AND SUMMARY OF THE INVENTION

It is a primary object of the present invention to provide a dynamic-pressure fluid bearing which is immune, or at least, highly resistant, to wear and seizure. This object is achieved by surface treatment on aluminum alloy for the rotor and bearing of a polygon mirror driving motor.

In accordance with the invention, a dynamic pressure fluid bearing in which a resin layer is provided on one or both of the bearing surfaces of a hydrodynamic bearing that is formed between a shaft and a sleeve, wherein a particle removing function is provided on the bearing resin layer or a resin layer in the vicinity of the bearing resin layer.

In accordance with another embodiment of the invention, a a motor is provided with a dynamic-pressure fluid bearing in which the motor comprises a stator, a rotor that is rotatable relative to the stator, means for rotating the rotor, a polygon mirror fitted on the rotor, and a dynamic-pressure fluid bearing formed by surfaces of the stator and rotor, wherein one of the surfaces contains a polyamideimide coating thicker than 3 µm and the other surface is metal, and the polyamideimide contains PTFE, where an amount of the PTFE in the polyamideimide falls within a range of 3% to 20% by weight, and a particle removing function is provided on the bearing resin layer or a resin layer in the vicinity of the bearing resin layer.

For a better understanding of the present invention, reference is made to the following description and accompanying drawings while the scope of the invention will be pointed out in the appended claims.

DESCRIPTION OF THE PREFERRED EMBODIMENTS

Figures 1, 1A:
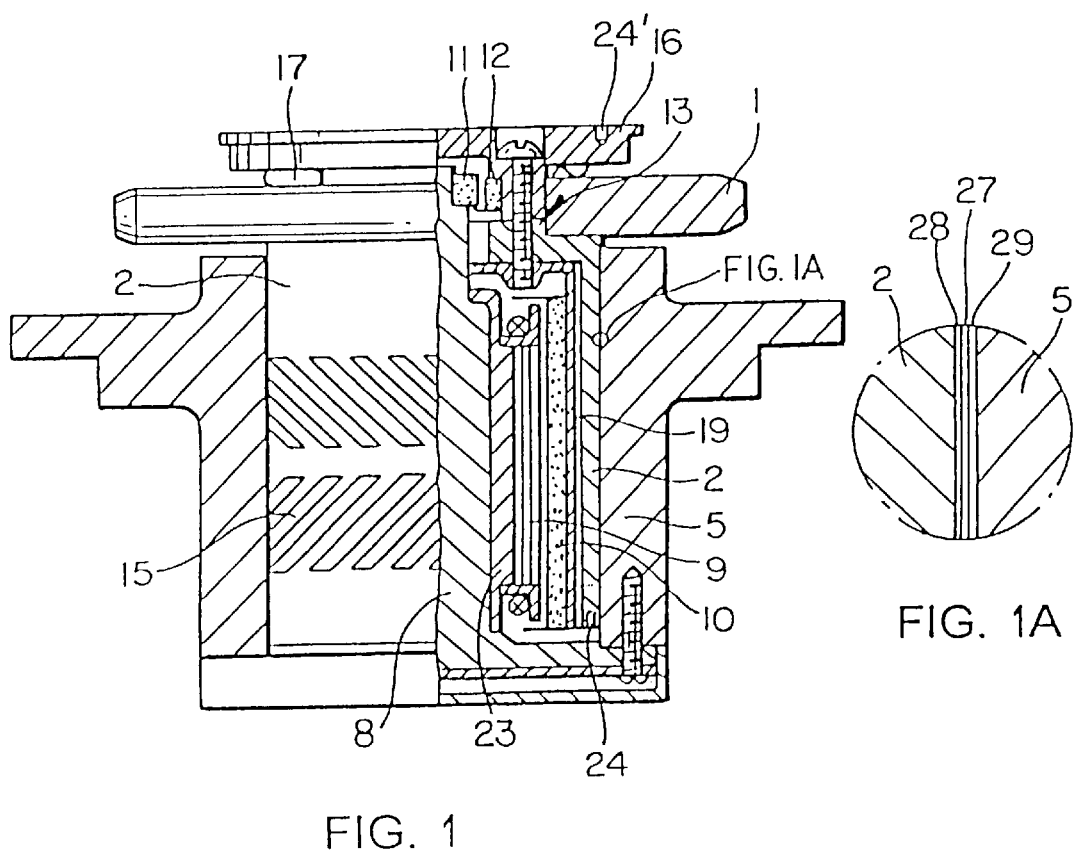
FIG. 1 is a sectional view of the motor in an example of the present invention.

An example of the present invention applied to a polygon mirror driving motor is explained with reference to FIG. 1. (Like reference characters designate like or corresponding parts in FIGS. 1 and 2.)

The motor is made up of a rotating part (including a polygon mirror 1 and a rotor 2) and a stationary part as a stator(including a bearing and a base). The rotating part of the motor comprises a balancing plate 16, corrugated spring 17, polygon mirror 1, rotor magnet 12, rotor 2, yoke 19, and drive magnet 10.

The rotor 2 is a bottomed cylinder. On the outer surface of the cylindrical part are formed spiral grooves 15 which generate the dynamic pressure. The surface of the cylindrical part is coated with electroless nickel plating 28 for corrosion and wear protection, as shown in the partly enlarged sectional view in FIG. 1. At the end of the rotor 2 is a projection 13 to which the polygon mirror 1 is fitted. To the bottom of the rotor 2 is fixed a balancing plate 16. The polygon mirror 1 is pressed against and fixed to the rotor 2 through a corrugated spring 17 placed between them so as to ensure the accuracy of the mirror surfaces. The balancing plate 16 holds the spring 17, functions as a means to correct imbalance after assembly, and functions as a carrying handle.

In the rotor 2 are arranged an iron yoke 19 (constituting the magnetic circuit to generate driving torque) and a drive magnet 10 (constituting a magnetic thrust bearing), which face each other. The cylindrical part of the yoke 19 is bonded (fixed) to the rotor 2. The drive magnet 10 is bonded (fixed) to the inside of the yoke 19.

The stationary part of the motor comprises a base magnet 11, base 8 having a column, coil 9, core 23, and bearing 5. The base magnet 11 is on that part of the column 8 which faces the rotor magnet 12, so that the base magnet 11 and the rotor magnet 12 constitute a magnetic thrust bearing. The coil 9 is fixed to the column of the base 8 with the core 23 between, so that it faces the drive magnet 10. The base 8 is screwed (fixed) to the bearing 5.

Figures 2, 2A:
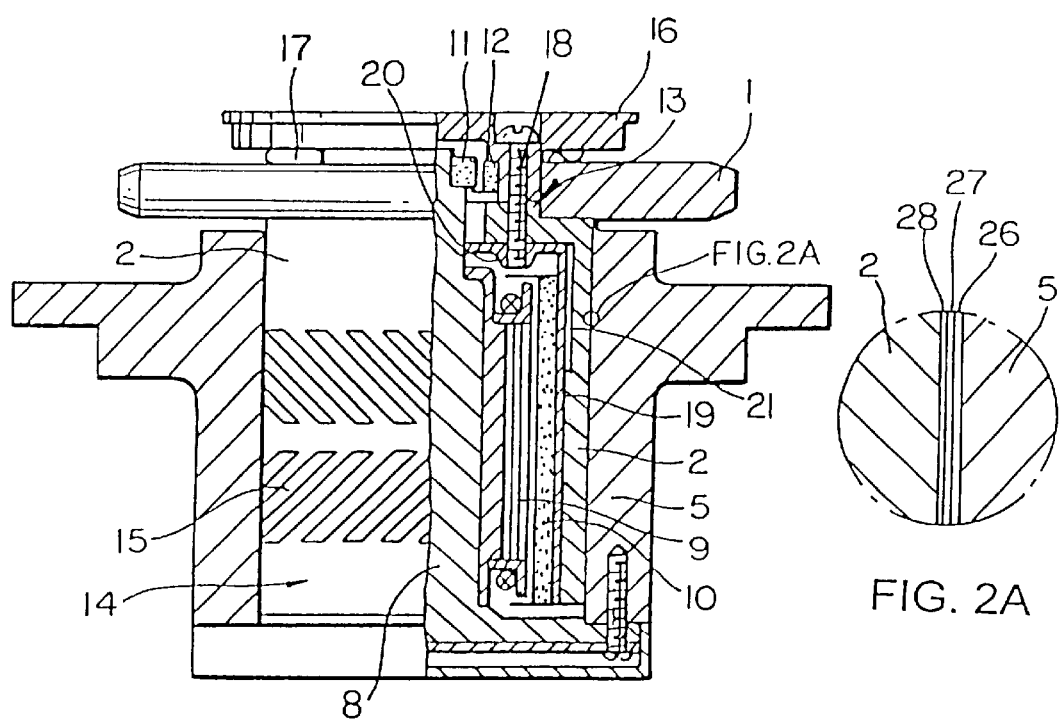
FIG. 2 is a sectional view of a conventional motor.

As shown in the partly enlarged sectional view in FIG. 1, the inner surface of the bearing 5, as well as the outer surface of the rotor 2, is coated with polyamideimide film 29 (thicker than 3 µm) containing a fluoro-containing resin dispersed therein. This coating film is intended to protect corrosion, wear, and seizure.

To ensure the adhesion of the polyamideimide coating 29, the aluminum substrate of the bearing 5 is given a surface roughness greater than 12 µm in maximum height (according to Japanese Industrial Standard B0601 which corresponds to ISO 468-1982, ISO 3274-1975, ISO 4287/1-1984, ISO 4287/2-1984, and ISO 4288-1985) by wet etching or sandblasting. On the roughened surface is formed a sufficiently thick layer of polyamideimide by spraying, brushing, dipping, or molding, and the layer is finished to have a desired thickness (greater than 3 µm) by lathing. The maximum height of such a roughened surface is measured in µm and is determined on a peak-to-peak basis.

Figure 3:
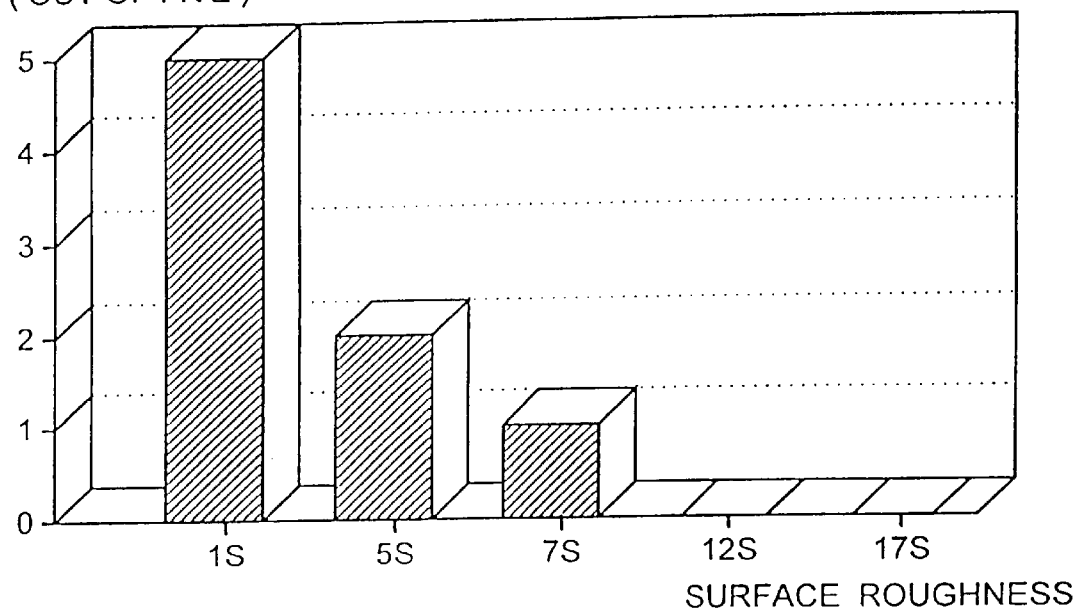
FIG. 3 is a graphical representation showing how the surface roughness of aluminum alloy affects the peeling of resin coating by heat shock.

According to the present invention, the surface roughness should be greater than 12 µm in maximum height. The reason for this specification is apparent from the results of experiments shown in FIG. 3. The experiments were conducted to see how the surface roughness affects the adhesion of the polyamideimide coating. Each five samples of aluminum alloy for the bearing as shown in FIG. 1 were given a surface roughness ranging from 1 µm to 17 µm in five steps. The samples were coated with polyamideimide containing PTFE (polytetrafluoroethylene) dispersed therein. The coating was finished to a 3-µm thick layer by lathing. The thus prepared samples (motors) were subjected to heat shock, and the number of the samples (out of five) which suffered peeling was counted.

Figure 4:
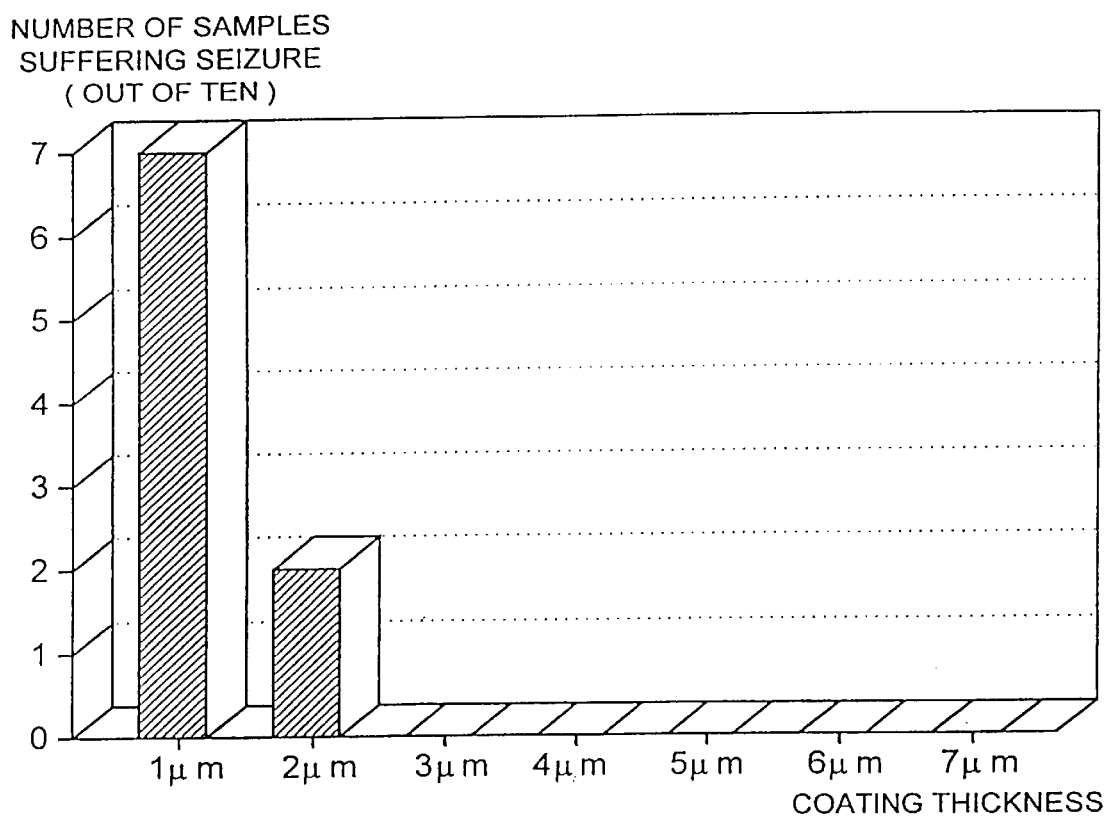
FIG. 4 is a graphical representation showing how the thickness of polyamideimide coating affects seizure due to contact during operation.

According to the present invention, the polyamideimide coating should be thicker than 3 µm. The reason for this specification is apparent from the results of experiments shown in FIG. 4. A coating thinner than 3 µm does not prevent seizure due to contact that occurs during operation. The experiments were conducted to see how the coating thickness affects the liability to seizure. Each ten samples of aluminum alloy for the bearing as shown in FIG. 1 were roughened to a surface roughness of 12 µm in maximum height and were given a coating of polyamideimide containing PTFE dispersed therein which ranges in thickness from 1 to 7 µm in seven steps. The surface opposite to the rotor was given electroless nickel plating. The thus prepared ten motors were run, with the coating forced to come into contact with the opposing surface 100 times. The number of the motors (out of ten) which suffered seizure was counted.

In another embodiment of the invention, the bearing 5 may be made of an anodized film substrate with a surface roughness greater than 2 µm in maximum height according to Japanese industrial standard B0601.

Figure 5:
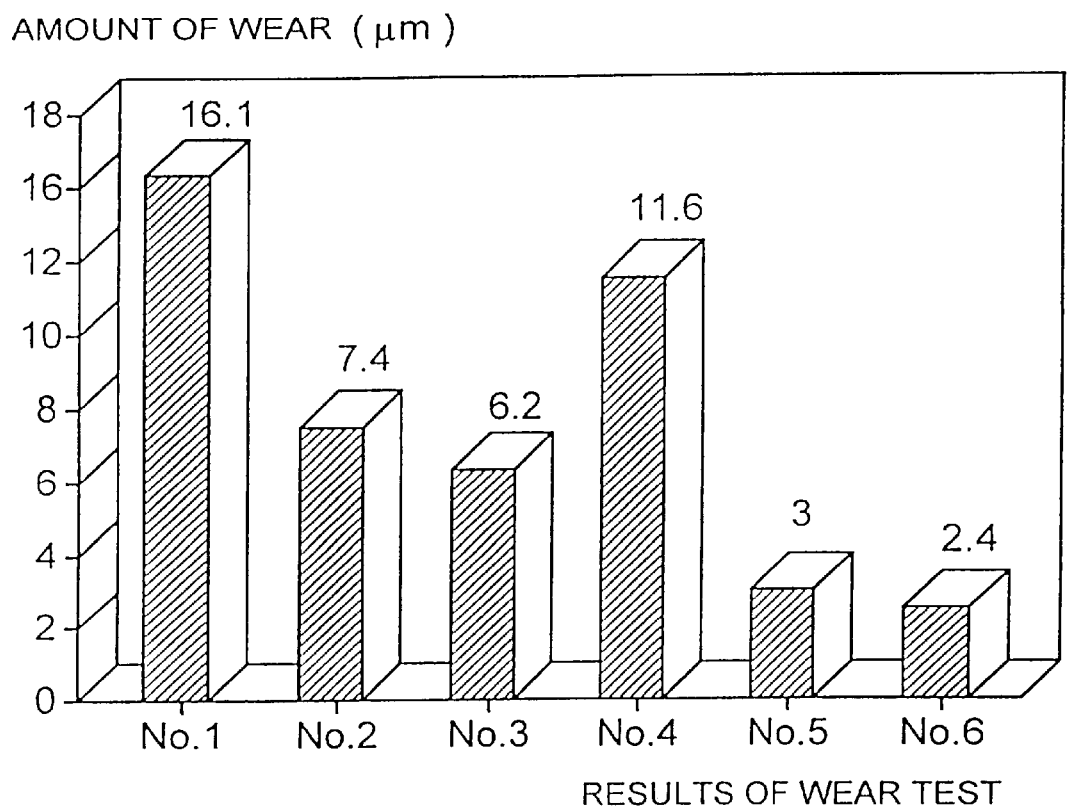
FIG. 5 is a graphical representation showing the wear characteristics of coating resins.

According to the present invention, the coating film should be made of polyamideimide. The reason for this specification is apparent from the results of comparison of polyamideimide with epoxy resin, which is a thermosetting plastic, as shown in FIG. 5. It is noted that polyamideimide is superior in wear resistance to epoxy resins. The coating materials used in the experiments were polyamideimide from Shikoku Kasei Kogyo Co., Ltd. and epoxy resins from Toyo Drylube Co., Ltd.

Figure 6:
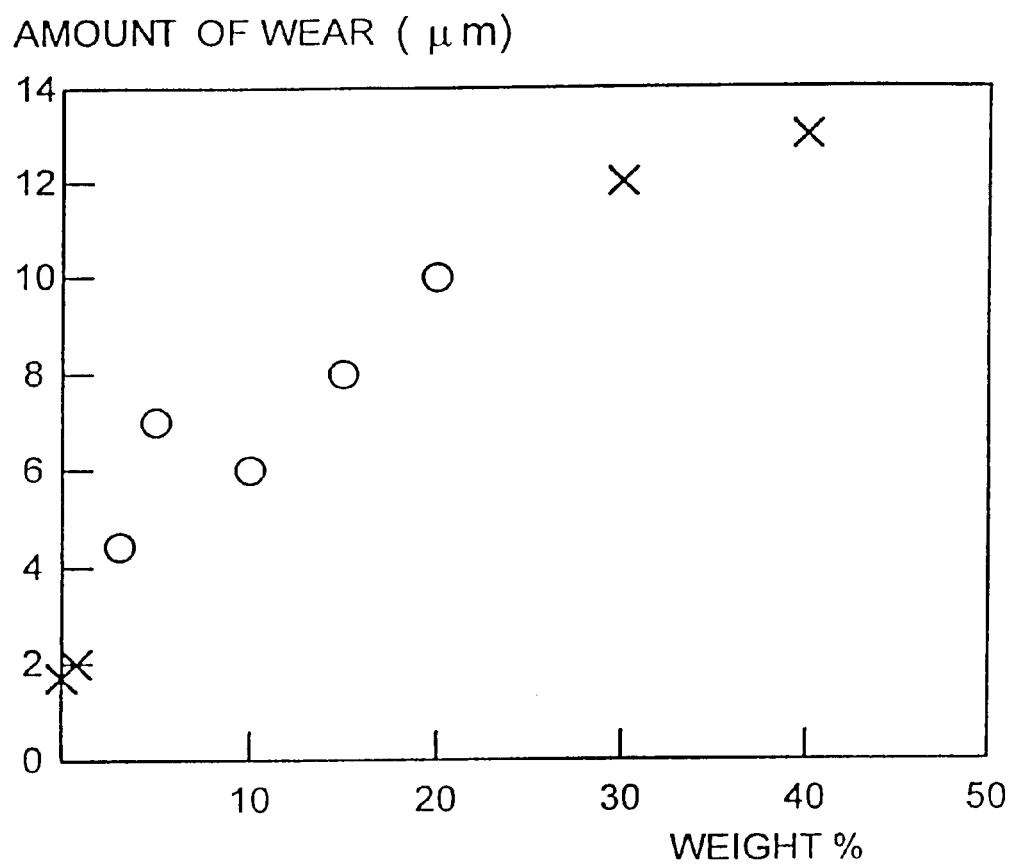
FIG. 6 is a graph indicating the amount of wear of a bearing in accordance with the invention versus the amount of PTFE (polytetrafluoroethylene) in the polyamideimide coating.

FIG. 6 illustrates the amount of wear in $\mu$m of the surface as a function of the amount of PTFE in the polyamideimide coating. It is seen that a preferred range of 3%–20% in weight provides the optimum area of use. A greater percentage increases wear and may lead to seizure. A lesser amount leads to a spreading wear powder (i.e., small particles distributed on the surface). The spreading powder contaminates the inside of the motors especially in the polygon mirror motors. The spreading powder deteriorates the reflectance of the polygon mirror which requires more than 80% reflectance. The following table indicates the relation of the amount of PTFE to the polygon mirror reflectance.

| Weight % PTFE | Polygon Mirror Reflectance % |
|---|---|
| 1 | 75 |
| 3 | 80 |
| 5 | 83 |
| 10 | 88 |
| 15 | 92 |
| 20 | 95 |
| 30 | 97 |

According to the present invention, aluminum alloy should preferably be used for the balancing plate 16, polygon mirror 1, rotor 2, bearing 5, and base 8. The advantage of aluminum alloy is low thermal expansibility (which leads to small mechanical deformation and parts displacement due to temperature change) and small inertia (which permits rapid starting).

The rotary part comprising mainly the rotor 2 and the polygon mirror 1 is inserted into the stationary part comprising mainly the bearing 5. Between them in the radial direction is a clearance 26 of the order of several to ten-odd micrometers, as shown in the partly enlarged sectional view in FIG. 1. As the rotor 2 rotates, the clearance creates the dynamic pressure which holds the rotary part concentrically with the stationary part. In addition, the rotary part is held afloat by the magnetic thrust bearing composed of the paired magnets 11 and 12 which attract each other.

The balancing plate 16 is necessary to remedy imbalance which will occur when the motor is assembled by mechanical fitting. Remedy of imbalance is accomplished by drilling holes 24 and 24' in the balancing plate 16 and the end of the rotor 2.

As mentioned above, the dynamic-pressure pneumatic bearing of the present invention has either of the rotor 2 and the bearing 5 coated with polyamideimide and the other of them coated with electroless nickel plating. Such provision protects the dynamic-pressure pneumatic bearing from wear due to sliding which occurs when the motor starts and stops. Such provision also protects the bearing from damage by contact resulting from external turbulence during operation. Being free from contact during operation, the dynamic-pressure bearing has a semipermanent life.

Although the present invention has been explained above with reference to a bearing for the polygon mirror-driving motor, it may also be applied to an air- or oil-lubricated bearing for the hard disk-driving motor. In addition, the polyamideimide coating may also be given to the rotor. The polyamideimide may also be incorporated with molybdenum disulfide or graphite, as well as a fluoro-containing resin. Such an additive does not necessarily need to be dispersed.

The polyamideimide coating may also be formed on the bearing of copper alloy or iron alloy, as well as the bearing of aluminum alloy.

The surface treatment of the bearing 5 is not limited to electroless nickel plating; but it may also be any other metal plating or anodized film.

The present invention provides a dynamic-pressure fluid bearing in which either of the dynamic-pressure surfaces is given a polyamideimide coating thicker than 3 $\mu$m and the other of them is given a metal surface. This structure protects the bearing from wear that occurs when the motor starts and stops and also protects the bearing from damage by contact resulting from external turbulence. Thus the present invention permits the construction of a gas or liquid-lubricated bearing having a long life.

In accordance with a further embodiment of the present invention, any of the previously discussed embodiments may further be carried out in accordance with the improvement discussed below. The further improvement is provided to further prevent sticking from foreign matter in surfaces of a dynamic pressure pneumatic (fluid) bearing that is formed between a shaft and a sleeve. Such is an improvement in "anti-seize".

In an improved embodiment, the volume resistivity is $10^{10}$ $\Omega$ cm or less and the conductive inorganic filler is a powder of aluminum, graphite, carbon black, copper, nickel, stannic oxide, indium Oxide, etc.

In a first example, the spherical graphite of mean particle size (diameter) is 5 $\mu$m; the amount of an acjunction: 20 Vol %; and the volume resistivity: $4 \times 10^8$ $\Omega$ cm.

In a second example, the 325 mesh scale (squamate) graphite (maximum length about 40 $\mu$m); the amount of an acjunction: 10 Vol %; and the volume resistivity: $4 \times 10^6$ $\Omega$ cm.

In a third example, which consists of A+B, wherein A is the spherical graphite of mean particle size (diameter) of 5 $\mu$m; and B is the carbon black of mean particle size (diameter) of 0.5 $\mu$m. The amount of an acjunction is: A=10 Vol % and B=1 Vol %. The volume resistivity is $8 \times 10^6$ $\Omega$ cm.

In another improved embodiment, the resin layer is higher in electrification than the bearing resin layer (note that there is less case to use). Accordingly, the resin bearing layer is epoxy (system). The dielectric constant permitivity=3.5.

The resin layer has a high dielectric constant permitivity: Alkyd resin (unsaturated polyester). Dielectric constant permitivity=6.1.

Both resins mentioned above have about $10^{15}$ $\Omega$ cm of the volume resitivity. A coating is applied by spraying.

The effect of the above-mentioned improved embodiments prevent the bearing surfaces from absorbing dust and other foreign material due to electrification. This makes it easier to remove dust than by means of blowing air and the like during assembly, thus preventing the dust from remaining in the space between the shaft and the bearing. If the dust remains on the parts, such dust is removed when the motor rotates, by the hydrodynamic pressure power which results from rotation. This results in stability and prevention of seizure.

In the event resin powder remains on the parts, since there is no electrification, the dust doesn't remain upon the generation of hydrodynamic pressure (when the motor rotates).

While the foregoing description and drawings represent the preferred embodiments of the present invention, it will be obvious to those skilled in the art that various changes and modifications may be made therein without departing from the true spirit and scope of the present invention.

What is claimed is:

1. A dynamic pressure fluid bearing in which a resin layer is provided on one or more bearing surfaces of a hydrodynamic bearing formed between a shaft and a sleeve, wherein a means for preventing particles from adhering thereto due to electrification is provided on said bearing resin layer on said one or more bearing surfaces or on a layer of said hydrodynamic bearing located in close proximity to said resin layer.

2. The dynamic pressure fluid bearing of claim 1, wherein a volume resistivity of said resin layer is $10^{10}$ $\Omega$ cm or less.

3. The dynamic pressure fluid bearing of claim 2, wherein a conductive inorganic filler is added to said resin layer.

4. The dynamic pressure fluid bearing of claim 3, wherein a resin layer higher in electrification than said bearing resin layer is provided in a vicinity of said bearing resin layer.

5. The dynamic pressure fluid bearing of claim 1, wherein said bearing resin layer is comprised of an anti-wear resin of polyimide.

6. The dynamic pressure fluid bearing of claim 5, wherein said bearing resin includes 10–80 mol % of PTFE.

* * * * *